June 7, 1960 R. L. VON REPPERT 2,939,172
METHOD AND APPARATUS FOR THE GRANULATION OF METALS
Filed June 19, 1956
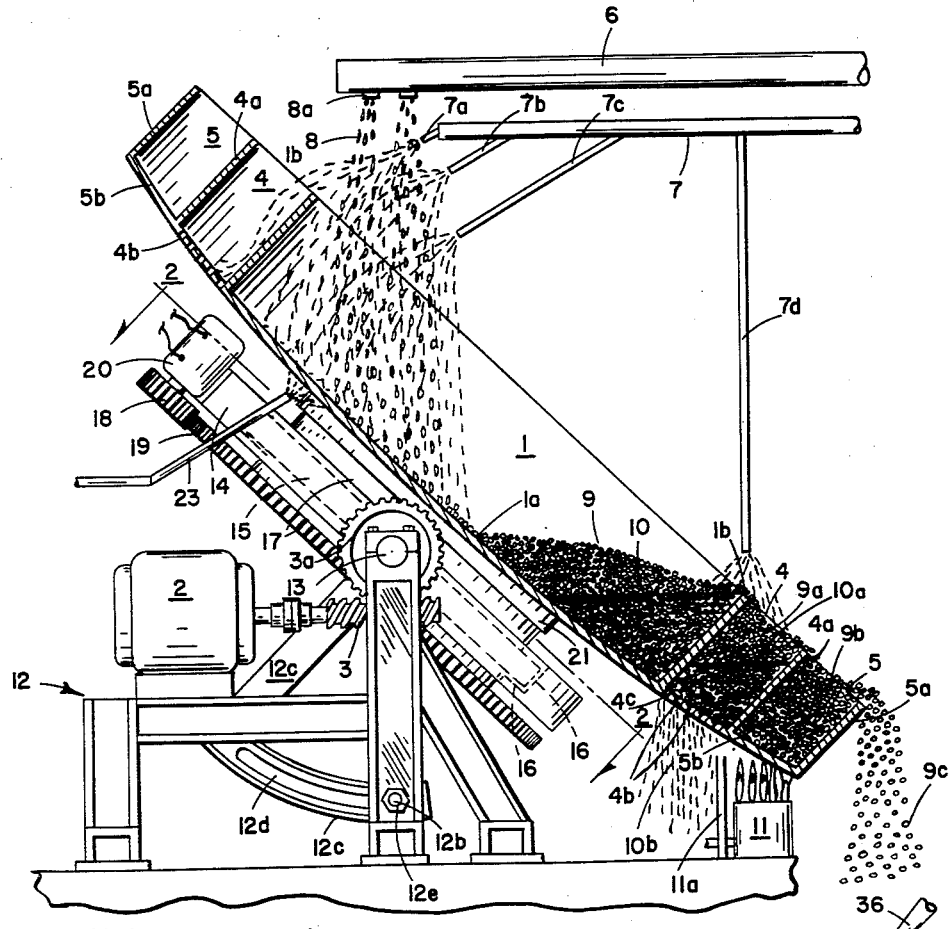
FIG. 1
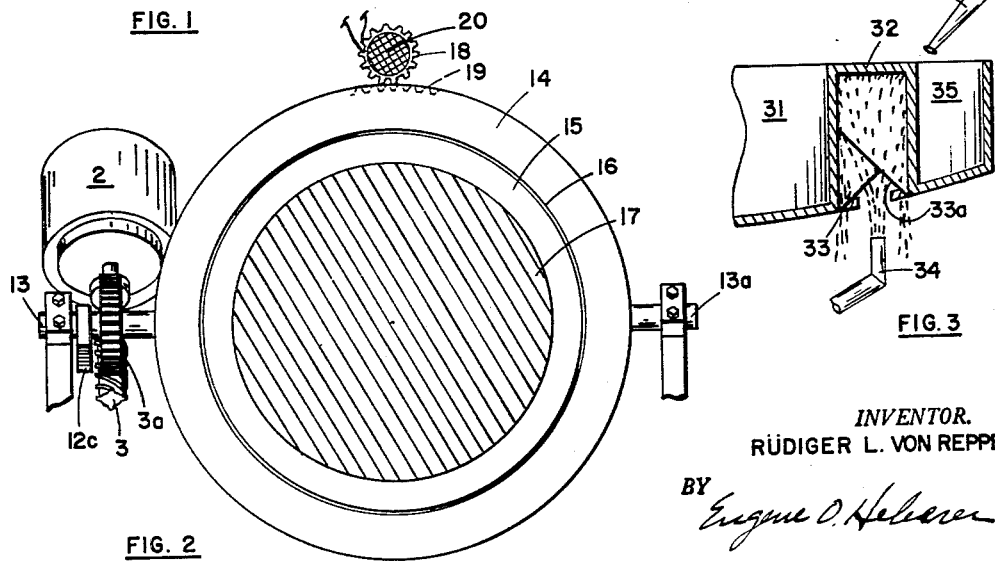
FIG. 2
FIG. 3
INVENTOR.
RÜDIGER L. VON REPPERT
BY Eugene O. Helsen
ATTORNEY った
United States Patent Office 2,939,172
Patented June 7, 1960

2,939,172

METHOD AND APPARATUS FOR THE GRANULATION OF METALS

Rüdiger Lothar von Reppert, Wiesbaden, Germany, assignor of one-half to Paul O. Tobeler, doing business as Trans-Oceanic, Los Angeles, Calif.

Filed June 19, 1956, Ser. No. 592,284

16 Claims. (Cl. 18—2.4)

This invention relates to a method and the apparatus for converting liquid metals, especially pig iron, into the granulated form.

It is known to direct the stream of liquid pig iron in individual jets toward a rotating cone, upon which water is being sprayed, to cause the formation of metal droplets which are then further cooled in a tank of water. The present invention is an improvement over this and other processes.

The advantages of the preparation of granulated pig iron, compared to pouring it into pig molds, are the technical simplification and the economy accomplished thereby. Additional advantages of having pig iron in the granulated form are:

(1) It is easier to select and separate any certain amount than it is with pig molds and scrap iron;
(2) The losses of the iron within the slag are considerably reduced over those when pig iron molds or scrap is used;
(3) The coke consumption is considerably less than with the use of the pig molds in blast furnaces; and
(4) It is far more suitable for storage than in any other form.

According to the present invention, the liquid pig iron is passed through a distribution trough and it is poured or allowed to flow therefrom through one or more individual jets into an inclined substantially cylindrical container, which is being rotated about its axis. The liquid metal is sprayed with water or other cooling fluids as it is flowing from the distribution trough into the cylinder and after it is in the cylinder. Surrounding the rotating cylinder, there are one or more annular troughs, the first of which is continuously filled with water, or other cooling fluids, to cool the metal and to act as a cooling jacket for the cylinder. Practically all of the cooling fluid is drained through small holes in the bottom of the first annular trough.

Granulation occurs within the inclined cylinder and the metal is, thus, cooled and granulated in one operation. As the granules are formed, they spill or flow from the rotating cylinder into the first annular trough, and then into a second trough from which they are further spilled and collected for drying and storage.

It is, therefore, an object of this invention to provide a method for the granulation of liquid metals.

It is a further object of this invention to provide an apparatus for the granulation of liquid metals.

Other objects of invention will become apparent from the following description taken in connection with the accompanying drawings, in which Fig. 1 is a side elevational view of the granulation apparatus, showing the cylinder and troughs in cross section;

Fig. 2 is a view taken along the line 2—2 of Fig. 1;

And Fig. 3 is a cutaway view of an alternate embodiment of the invention showing a cylinder with a closed-top type cooling jacket surrounded by an annular trough.

Referring to Figs. 1 and 2, cylindrical container 1 is supported on stand 12 by inclinable support ring 14 and shafts 13 and 13a. For a very heavy structure, motor 2 is provided to drive pinion 3 and in turn gear 3a, keyed to shaft 13 to incline the cylinder and its surrounding troughs. Motor 2 is also supported by stand 12. Inclining support arm 12c is keyed to shaft 13 and has sliding arm 12a, which by means of slot 12d slides on bolt 12b. Nut 12e and bolt 12b are locking and support means to hold the cylinder in any desired inclined position. Heavy supporting ring 14 is secured to shafts 13 and 13a and provides bearing surfaces on its upper inner circumference 16 and on its inner flange bottom 16a for rotatable bearing mounted disc 15. Rotating shaft or axle 17 is secured to and extends through disc 15 for rotation therewith, and is further secured to base plate 21 which is in turn secured to the bottom of cylinder 1. Also secured to axle 17 at its lower extremity is cylinder driving gear 19 which is driven by motor 20 via gear 18.

Cylinder 1 has a generally concave inner bottom 1a and the inner bottoms 4c and 5b of troughs 4 and 5, respectively, extending radially outward from the cylinder, provide a generally concave cross section. Cylinder 1 has a common wall 1b with trough 4, and troughs 4 and 5 have a common wall 4a. Outer wall 5a of trough 5 and walls 1b and 4a are of such height as to provide a substantially straight line cross section at the tops of the cylinder and troughs. Bottom 4c of trough 4 has many small holes 4b, extending therethrough, spaced circumferentially around cylinder 1.

Extending above inclined cylinder 1 is liquid metal distribution trough 6, in position to spray liquid metal 8 upon the raised portion of inclined bottom 1a of cylinder 1. As liquid metal 8 is sprayed or poured into cylinder 1, it is sprayed with a cooling fluid, such as water, supplied through pipe 7 and individual sprinkler pipes 7a, 7b, and 7c. The latter pipes provide a continual spray on the liquid metal in its flow path into cylinder 1 and after it hits the bottom of cylinder 1. Additional sprinkler pipe 7d sprays cooling fluid directly into the lower portion of cylinder 1 and the lower portion of trough 4.

Heater 11 is provided under trough 5 to start the drying process of granules 9b therein. Shield 11a prevents the cooling fluid from flowing onto heater 11.

A granulating unit similar to the one shown in Figs. 1 and 2 has been in successful operation. It was made having the following dimensions: the cylinder, as container 1, has a diameter of 3200 millimeters and has a common wall with a first trough of 300 millimeters; the two concentrically situated annular troughs have widths of 500 millimeters and have walls similar in height to the cylinder, although they need not be of any definite measurement. In this species the liquid metal distribution trough is provided with 4 jets and provides a stream of liquid metal at the rate of 20 tons per hour. The cylindrical container is rotated 11 revolutions per minute, being inclined about 47 degrees.

In operation, the liquid metal is passed through the distribution trough 6 through jets or holes 8a and it flows into the rotating cylinder 1, being continually sprayed by cooling water from pipes 7a, 7b, and 7c. As the liquid metal falls, it is cooled suddenly by the water and granules are formed by the time the metal reaches bottom 1a of container 1. At this point the granules are not quite hardened and they become ball shaped by the rotation of cylinder 1. For further cooling the exterior bottom of cylinder 1 is continually sprayed by sprinkler 23. The motors can be shielded to avoid being made wet. Granules 9 collect in the lower part of cylinder 1 and are further cooled there by water from sprinkler 7d. The water stands in cylinder 1 to the level 10 and it overflows with granules into trough 4 which is also sprayed by sprinkler 7d. Granules 9a in trough 4 are further cooled by water 10a standing in trough 4. Through the bottom of trough 4 are holes 4b of about one millimeter in diameter and which permit water 10b to drain from said trough. Most of the fines formed also drain through these small holes and can be collected separately from the larger granules.

The other granules 9b, having diameters of 2 to 6 millimeters, overflow into trough 5. This apparatus and method can be operated without a second trough, such as 5, but it is desirable as a storing unit and granules 9b can be partially dried therein by heater 11. As the formation of granules and rotation continues, granules 9c overflow and are spilled from trough 5 at which time they can be collected for further storage.

The rotation of the central container and troughs and the continuity of the cooling provide a granulation of droplets, the majority of which are within the size range of 2 to 6 millimeters in diameter. They can be stored immediately after cooling, the cohesion and corrosion of the granules being negligible.

The rate of rotation and the amount of inclination of the aforesaid apparatus can be varied in accordance with the time required for the formation and the cooling of the granules, as well as with regard to the desired size thereof.

In Fig. 3, another embodiment of the present invention is shown. A container 31, shown partially, is similar to container 1 of Fig. 1 and is surrounded by a closed type cooling jacket 32, which is continually sprayed during operation with a coolant by sprinkler 34. Radially outward and surrounding jacket 32 is annular trough 35 which is similar to trough 5. Jacket 32 and trough 35 are structurally supported by fin supports 33 and 33a. Extending downward, above trough 35, is sand spout 36 which provides a spray of sand into the aforesaid trough.

In this embodiment the process is similar to that performed with the structure shown in Fig. 1; that is, the metal flows into and is chilled in the same manner in the inclined principal container. However, in this case the first structure surrounding container 31 is cooling jacket 32 which is closed on the top and is cooled by sprinkling from the bottom. As the granules flow out of container 31, they flow over the top of jacket 32 and into trough 35 where they are sprayed and mixed with fine granules of sand. In the aforesaid manner, the sand and granules are spilled out of trough 35 and are collected thereunder. They can be caught on a screen or a filter from which, by the application of compressed air, the granules can be separated from the sand and further cooled in the same operation.

It is necessary that the liquid pig iron, or other metal, impinge upon the inner bottoms of containers 1 and 31 in as fine a jet as possible. The impingement of the liquid pig iron upon the rotating granulating apparatus, and the subsequent cooling of the said iron causes it to be split up into extremely uniform, individual droplets. The advantage of the uniform granule size is obvious and is an improvement within the frame of the already known advantages of pig iron granules over the formation of pig iron ingots.

The cooling fluid used, according to the present invention, is drained from the apparatus as indicated, and is returned to a cooling tower.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An apparatus for the granulation of metal comprising a container having its upper end open, a first trough immediately surrounding and secured to said container, means to rotate and incline said container and said first trough, means adapted to cause liquid metal to flow into the raised portion of said container when said container is inclined, and sprinkler means adapted to sprinkle said liquid metal while it is flowing into and after it is in said container.

2. The apparatus according to claim 1 including a second trough connected to and immediately surrounding said first trough, additional sprinkler means adapted to sprinkle said first trough, and holes extending through the bottom of said first trough.

3. An apparatus for the granulation of metal comprising a cylinder having its upper end open and having a closed bottom, said bottom having a concave interior surface, a first annular trough immediately surrounding and secured to said cylinder, means to rotate and incline said cylinder and said first annular trough, a liquid metal distribution trough extending over said cylinder and having openings therethrough adapted to permit liquid metal to flow into the raised portion of said cylinder when said cylinder is inclined, and sprinkler means adapted to sprinkle said liquid metal in its path between said distribution trough and said cylinder.

4. The apparatus according to claim 3 including a second annular trough immediately surrounding and secured to said first annular trough, additional sprinkler means adapted to sprinkle said first annular trough, and minute holes extending through the bottom of said first annular trough, the inner bottoms of said cylinder and said annular troughs having a generally concave cross section, the tops of said annular troughs and said cylinder having a substantially straight line cross section.

5. An apparatus for the granulation of metal comprising a cylinder having its upper end open and having a closed bottom, said bottom having a concave interior surface, means to rotate said cylinder about its axis, means to adjustably incline said cylinder, a first annular trough surrounding said cylinder, said cylinder and said first trough having a common wall, minute holes extending through the bottom of said first annular trough, a second annular trough surrounding said first annular trough and having a common wall therewith, the inner bottoms of said cylinder and said annular troughs having a generally concave cross section, the tops of said annular troughs and said cylinder having a substantially straight line cross section, a liquid metal distribution trough extending over said cylinder and having openings therethrough adapted to permit liquid metal to flow into the raised portion of said cylinder when said cylinder is inclined, first sprinkler means adapted to sprinkle cooling fluid on said liquid metal in its path between said distribution trough and said cylinder, second sprinkler means adapted to sprinkle cooling fluid into said first annular trough, third sprinkler means adapted to sprinkle cooling fluid on the exterior of said cylinder's bottom, and means to heat said second annular trough.

6. A method for the granulation of metal comprising rotating an inclined generally cylindrical container having its upper end open, pouring liquid metal into the raised portion of said inclined container, sprinkling said poured metal with cooling fluid before and after it enters said container, forming metal granules in said container.

7. The method recited in claim 6 further comprising spilling said granules over a closed cooling jacket immediately surrounding and secured to said container and into a trough immediately surrounding said jacket, mixing sand with said granules in said trough, and spilling said sand and granules over the outer wall of said trough onto a screen, and separating and further cooling said granules and sand by blowing compressed air thereon.

8. The method recited in claim 6 further comprising spilling said granules and said cooling fluid into a first annular trough which immediately surrounds said container and rotates therewith, sprinkling additional cooling fluid into said first trough, draining said cooling fluid from said first trough, draining some of said granules with said cooling fluid from said first trough, and spilling some of said granules over the outer edge of said first trough.

9. The method according to claim 8 further comprising receiving some of said granules in a second annular trough which immediately surrounds said first annular trough, and drying said granules in said second annular trough by heating said last-mentioned trough.

10. The method according to claim 9 further comprising spilling granules from said second annular trough and collecting for storage.

11. An apparatus for the granulation of metal comprising a cylinder having its upper end open and having a closed bottom, said bottom having a concave interior surface, means to rotate and incline said cylinder, a cooling jacket immediately surrounding said cylinder, an annular trough immediately surrounding said cooling jacket, means to spray fine granular sand into said annular trough, the tops of said annular trough, said cooling jacket and said cylinder having a substantially straight line cross section, a liquid metal distribution trough extending over said cylinder and having openings therethrough adapted to permit liquid metal to flow into the raised portion of said cylinder when said cylinder is inclined, first sprinkler means adapted to sprinkle cooling fluid on said liquid metal in its path between said distribution trough and said cylinder, and second sprinkler means adapted to sprinkle cooling fluid on the exterior of said cylinder and into said cooling jacket.

12. An apparatus for the granulation of metal comprising a container having its upper end open and having a closed bottom, means to rotate and incline said container, a liquid metal supply means located above said container in position to supply liquid metal to the raised portion of said container when said container is inclined, and sprinkler means above said container in position to spray said liquid metal while it is flowing into and after it is in said container.

13. An apparatus for the granulation of metal comprising: a cylinder having its upper end open and having a closed bottom; a first annular trough immediately surrounding and secured to said cylinder; minute drain passages extending through the bottom of said first annular trough; a second annular trough immediately surrounding and secured to said first annular trough, the tops of said annular troughs and said cylinder having a substantially straight line cross section; means to adjustably incline said cylinder and said annular troughs; means to rotate said cylinder and said annular troughs about the axis of said cylinder; a liquid metal distribution trough extending over said cylinder and having openings therethrough to permit liquid metal to flow into the raised portion of said cylinder when said cylinder is inclined; first sprinkler means adapted to sprinkle cooling fluid on said liquid metal in its path between said distribution trough and said cylinder; and second sprinkler means adapted to sprinkle cooling fluid into said first annular trough.

14. An apparatus for the granulation of metal comprising: a cylinder having its upper end open and having a closed bottom; an annular trough immediately surrounding and secured to said cylinder; drain passages extending through the bottom of said annular trough, the tops of said annular trough and said cylinder having a substantially straight line cross section; means to adjustably incline said cylinder; means to rotate said cylinder and said annular trough; a liquid metal distribution trough extending over said cylinder and having openings therethrough adapted to permit liquid metal to flow into the raised portion of said cylinder when said cylinder is inclined; first sprinkler means adapted to sprinkle cooling fluid on said liquid metal in its path between said distribution trough and said cylinder; and second sprinkler means adapted to sprinkle cooling fluid into said annular trough.

15. An apparatus for the granulation of metal comprising: a generally cylindrical container having its upper end open and having a closed bottom; a first annular trough immediately surrounding and secured to said cylinder; the tops of said annular trough and said cylinder having a substantially straight line cross section; means to rotate said cylinder and said annular trough; and means to adjustably incline said cylinder and said annular trough.

16. An apparatus according to claim 15 comprising: drain passages extending through the bottom of said first annular trough; and a second annular trough immediately surrounding and secured to said first annular trough.

References Cited in the file of this patent

UNITED STATES PATENTS

| 2,451,546 | Forton | Oct. 19, 1948 |
|---|---|---|
| 2,739,348 | Rayburn | Mar. 27, 1956 |
| 2,818,601 | Agarwal | Jan. 7, 1958 |

FOREIGN PATENTS

| 530,620 | Belgium | Aug. 14, 1954 |
|---|---|---|
| 915,072 | Germany | July 15, 1954 |
| 752,978 | Great Britain | July 16, 1956 |